(12) United States Patent
Larson et al.

(10) Patent No.: US 6,382,226 B1
(45) Date of Patent: May 7, 2002

(54) METHOD FOR DETECTING BROKEN VALVE STEM

(75) Inventors: Brent H. Larson, Dallas, TX (US);
Harry A. Burns; Larry Keith Brown, both of Marshalltown, IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

(21) Appl. No.: 09/836,307

(22) Filed: Apr. 17, 2001

(51) Int. Cl.[7] .................. F16K 37/00; F16K 31/12; F03B 1/10

(52) U.S. Cl. .................. 137/1; 137/486; 137/487.5; 137/552; 137/554

(58) Field of Search .................. 137/487.5, 486, 137/552, 551, 554, 1

(56) References Cited

U.S. PATENT DOCUMENTS

| | | | |
|---|---|---|---|
| 5,109,692 A | | 5/1992 | Fitzgerald |
| 5,197,328 A | * | 3/1993 | Fitzgerald ............ 137/487.5 |
| 5,439,021 A | | 8/1995 | Burlage et al. |
| 5,451,923 A | | 9/1995 | Seberger et al. |
| 5,502,999 A | | 4/1996 | Seberger et al. |
| 5,549,137 A | | 8/1996 | Lenz et al. |
| 5,558,115 A | | 9/1996 | Lenz et al. |
| 5,573,032 A | | 11/1996 | Lenz et al. |

* cited by examiner

Primary Examiner—A. Michael Chambers
(74) Attorney, Agent, or Firm—Marshall Gerstein & Borun

(57) ABSTRACT

A method for providing an indication and alarm of a possible failure in a fluid control valve stem, plug or seat in a process control system having a microprocessor based valve positioner. The drive pressure, drive signal and valve position feedback are monitored. If greater than a predetermined change in the drive pressure or the valve position feedback is detected, then a second series of detection steps is initiated. In the second detection steps the present set point to process value relationship, such as flow rate or other process variable is compared to a stored test cycle derived set point to process value relationship for the same set point. If there is a process value change, then the operator is alerted as this change may indicate there is a damaged valve stem, plug, or seat problem which needs to be inspected.

3 Claims, 2 Drawing Sheets

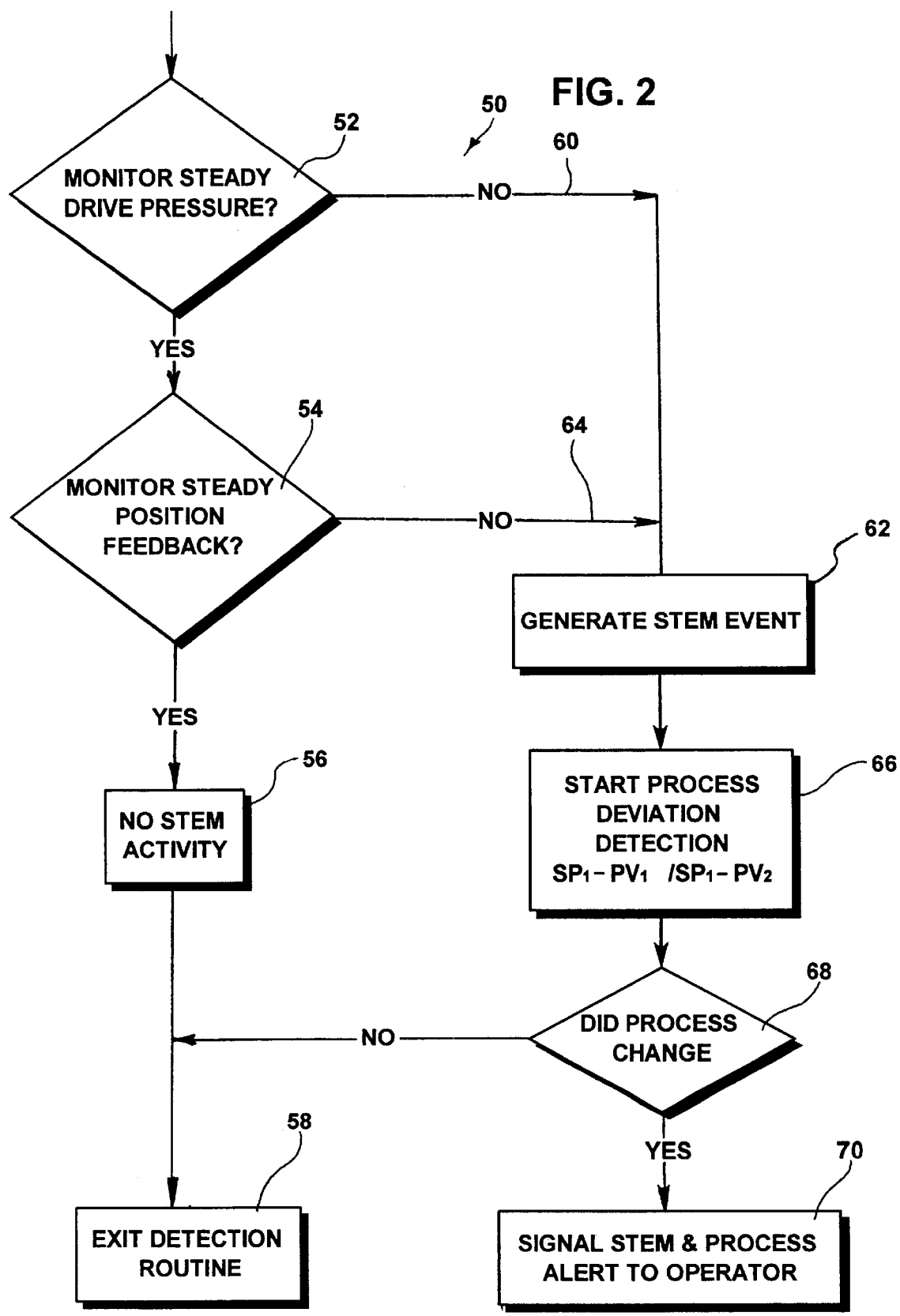

METHOD FOR DETECTING BROKEN VALVE STEM

This invention relates to valve positioners for positioning fluid valves which control a process variable, and particularly LO a method for detecting malfunctioning components of a control valve, such as a damaged or broken valve stem, or a damaged plug or seat.

BACKGROUND OF THE INVENTION

Valve positioners are in common usage for controlling fluid valves and associated fluids in oil and gas pipelines, chemical processing plants, etc. Typically the valve positioners include microprocessors for use in precisely controlling the process fluid and for performing diagnostic operations on the valve.

Various types of positioners are used in the process control industry. Some positioners are mechanically coupled to an actuator while some incorporate the actuator within the positioner. The actuator provides means for physically positioning the valve and may be either electrically, hydraulically or pneumatically operated. Electric actuators have a current signal which drives a motor which positions the valve. Hydraulic actuators have oil-filled means for positioning the valve. By far the most common type of valve actuator in the process control industry—a pneumatic actuator has a piston or a combination of a piston and a diaphragm. Depending on the application and the level of control integration, positioners receive several types of input from a controller which are representative of the desired valve position. One type is a current input having a 4–20 mA or 10–50 mA magnitude, a second is a digital signal superimposed on the current signal and a third is a fully digital input such as Fieldbus or HART®. Alternatively, the positioner may receive a 3–15 pound per square inch (PSI) pneumatic input representative of the desired valve position. Depending on the level of integration and the application as well, positioners have different types of outputs. Some positioners provide an output current to a motor, while still others have a fast responding hydraulic output. The most common type of positioner output is a 0–200 PSI pneumatic pressure output. Positioners, as the word is used in this application includes all these field mounted instruments, including the various inputs and outputs, and their respective means for positioning valves if applicable.

In the most common case of a spring and piston/diaphragm actuator, the diaphragm deflects with the pressure delivered by the positioner, thereby exerting a force or torque on a control valve stem or rotary member, respectively, so as to change the position of the valve. Almost all positioners have a mechanical or an electronic position sensor to provide a position signal which is fed back into a microprocessor based control section of the positioner. No matter what the specific means are for delivering force to position a valve, positioners having microprocessor based control algorithms are known.

In U.S. Pat. Nos. 5,549,137; 5,558,115; and 5,573,032, all assigned to the same assignee as herein, there is provided a microprocessor based valve positioner which has real-time diagnostics to provide valve and actuator integrity information. All such microprocessor based valve positioners cannot easily detect a broken valve stem, a broken or damaged valve plug, or a broken or damaged valve seat. If the valve stem breaks for instance in such a fashion that the linkage to the positioner instrument is intact, the instrument will monitor feedback and position the actuator to what it thinks is the correct valve position without actually moving the valve plug. In a modern microprocessor based positioner instrument, the positioner should respond rapidly through a valve stem breakage event (typically in less than 100 ms). A fast instrument response would mask any possible host monitoring of valve performance, making the occurrence of the valve stem breakage continue undetected until some process change occurred due to the failed valve performance. In such conditions, the valve plug could fail in a manner that doesn't greatly disturb the process, so the broken or damaged valve stem/plug/seat may continue undetected over a long period of time. Eventually this would lead to a loss of process control.

Actual detection of such broken valve components as a broken or damaged stem, plug, or seat, would require a vibration sensor or some other sophisticated mechanical sensor which would be expensive and also require add-on hardware to the positioner and valve assembly. It is therefore desirable to provide a technique which can be used to provide a sufficient indication of possible valve component breakage so as to suggest inspection is required by a technician. In particular, it would be desirable to provide such a stem loss/plug loss/seat loss detection technique which does not require additional mechanical components and which would be independent of any particular valve configuration, and thereby readily implemented to provide an early warning indication that there may be a breakage of a valve component.

SUMMARY OF THE INVENTION

In accordance with the principles of the present invention there is provided a method for indicating a possible failure in the valve stem or valve plug or valve seat in a configuration where a microprocessor based valve positioner is controlling a valve actuator and fluid control valve in a process control system.

In particular, the drive signal to the current to pressure (I/P) microprocessor based valve positioner is monitored; the drive pressure output of the valve positioner coupled to the valve actuator is also monitored for detecting a predetermined change from a steady drive pressure with no change in the set point drive signal input to the valve positioner. The valve stem position feedback is also monitored for detecting a predetermined change from a steady valve stem position feedback with no change in the set point drive signal. If at least one of the predetermined changes in steady drive pressure and the valve stem position feedback is detected, a stem/plug/seat event indication is provided.

Upon the occurrence of a stem/plug/seat event indication, there is initiated a monitoring of a process value for detecting any deviation in the process value, such as monitoring the relationship of the process flow rate for a set point value and detecting any changes in the relationship with no change in the set point. A deviation in the process value with no change in the set point indicates a possible valve stem breakage or a damaged valve plug or valve seat.

In implementing the method of the present invention, two alarm detections are run in parallel. The first alarm is for a valve disturbance alarm. Such an alarm would indicate a significant change, such as a greater than 10% change in drive pressure and/or valve position feedback without a corresponding change in set point. Detection of such a significant predetermined change would then enable detection of a second alarm.

The second alarm would look for a change in the set point to process value relationship with no change in the set point.

If a difference was detected, then an event could be sent indicating a possible stem/plug/seat problem. The operator would then look for a process problem, which, if detected, would lead to a human inspection of the valve.

The significant advantage of the present invention is being able to detect problems with a valve at an early stage and thereby save the possible loss of expensive process fluid. Also, the present invention can be used to identify and select fluid control valves which may require inspection.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 2 is a flow chart illustrating the method steps of the present invention

DETAILED DESCRIPTION

Figure 1:
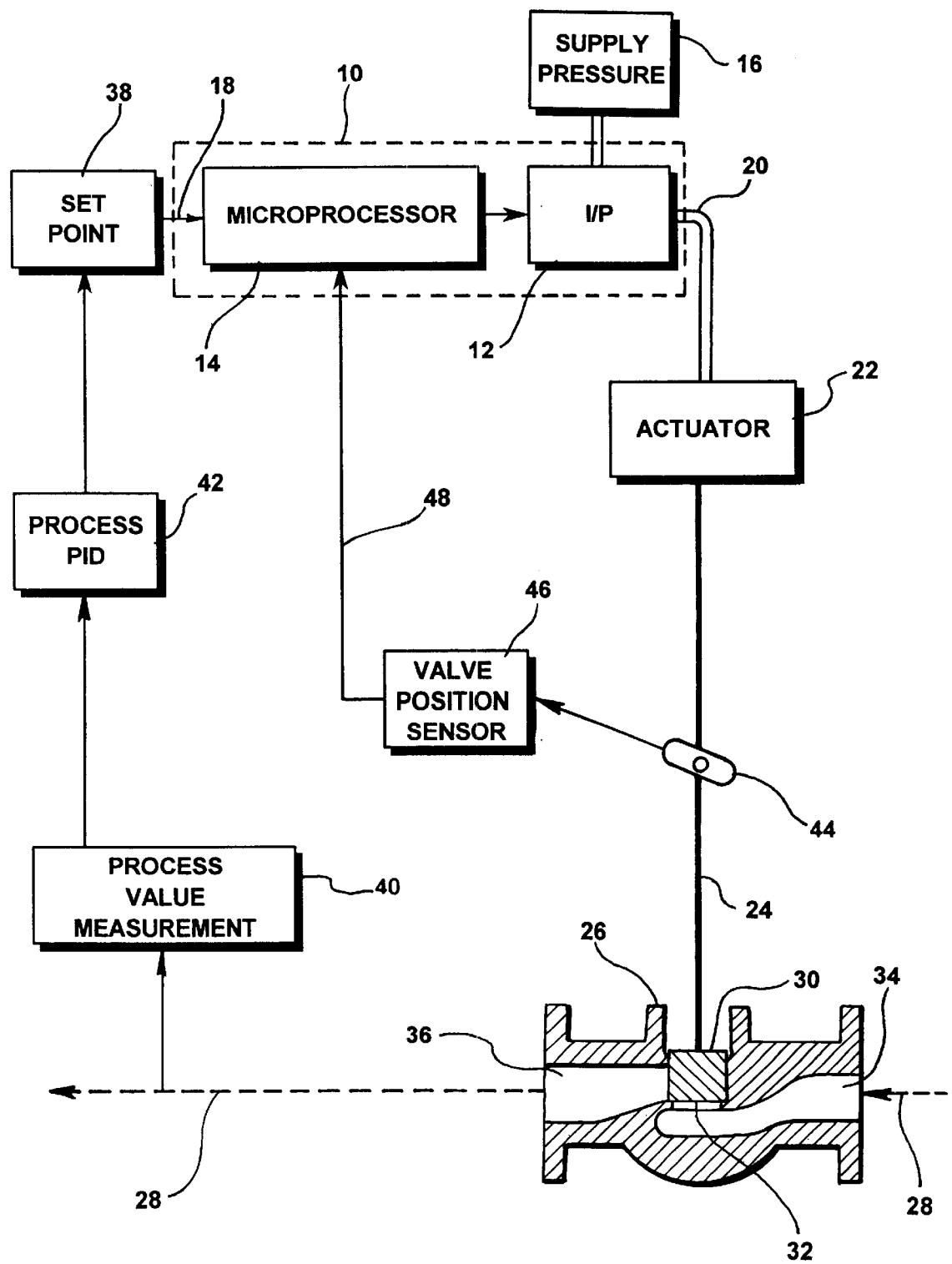
FIG. 1 is a schematic diagram illustrating a microprocessor based valve positioner operating an actuator and a fluid control valve in a process control system.

Referring now to FIG. 1, there is illustrated a microprocessor based valve positioner 10 including a current to pressure positioner 12 and a microprocessor 14. The valve positioner 10 is coupled to a supply pressure 16 and receives a drive signal on input line 18 for providing a corresponding drive pressure on output line 20 to a valve actuator 22. The output of the actuator 22 is coupled to a valve stem 24 of a fluid control valve 26. The valve 26 is coupled into a pipeline 28 of a fluid process system. The valve stem 24 is connected to a valve plug 30 which sealingly engages a valve seat 32 in controlling the flow of fluid from a valve inlet 34, through the valve seat in the valve opened position and to a valve outlet 36.

In typical operations of the fluid process control system, a set point circuit 38 provides a drive signal on the input line 18 to the microprocessor 14 and thereby moves the valve stem 24 through the actuator 22 to provide a desired process value at the output 36 of the valve 26. This process value, which may be for instance a desired flow rate, is determined by a process value measurement device 40 for coupling, for instance, to a well known process proportional/integral/ derivative (PID) unit 42 to reset the set point 38. A well know feedback configuration between the valve stem 24 and the vaive positioner 10 is provided by a feedback linkage 44 coupled to the valve stem to provide information as to the valve stem position to a valve position sensor 46. A valve position feedback signal from the valve position sensor 46 is coupled to the microprocessor 14 on feedback line 48.

In this typical fluid process control system, a standard valve positioner cannot easily detect a broken valve stem 24. If the valve stem 24 breaks in a location between the feedback linkage 44 and the valve plug 30, but the feedback linkage 44 to the actuator 22 is still intact, a standard positioner will monitor feedback and position the actuator to what it thinks is the correct position without actually moving the valve plug 30 because of the broken valve stem 24. Also, in a modern field instrument, a positioner should respond rapidly to such an event (less than 100 milliseconds, typically). A fast field instrument response masks any standard monitoring of valve performance, making the broken valve stem go undetected until some process value change occurred which would be sensed by the process value measurement 40 due to the failed valve performance. As indicated previously, in some conditions, the valve stem and plug failure could be in a manner that doesn't greatly disturb the process, so the broken stem/plug may go undetected for some time. This would lead to a loss of process control.

Reference may be made to FIG. 2 in which there is indicated a method for presenting an indication of a possible problem in the valve stem, plug or seat and which can be used with other indicators to suggest inspection by a technician should take place. In the valve positioner 10 of the present invention, the microprocessor 14 includes a broken valve stem/plug/seat detection algorithm 50 performing the steps shown in FIG. 2.

As shown in FIG. 2, the drive pressure on line 20 resulting from a set point drive signal is monitored at step 52 to determine if a steady drive pressure 52 is maintained. Also, the valve position feedback on feedback line 48 is monitored at step 54 to determine whether there is a steady position feedback 54. If there is a steady drive pressure 52 and a steady position feedback 54 then it is determined there is no stem activity 56 and the exit detection routine 58 is achieved. However, if the valve stem breaks, for instance, the force on the actuator 22 will change, as the valve plug conducts some force from the process (or from frictional forces from the valve body) up to the actuator.

FIG. 2 illustrates two alarm detections run in parallel. The first alarm is for a valve disturbance alarm. Such an alarm would be a significant, such as a greater than 10% change in the drive pressure 20 as determined by the steady drive pressure monitor step 52 and/or greater than a 10% change in the valve position feedback 48 as determined by the steady position feedback monitor step 54 without a corresponding change in the set point 38. Thus, if there is not a steady drive pressure at step 52, then an alarm is generated on line 60 to generate a stem event 62. Similarly, if there is a greater than 10% change in the valve position feedback, then the steady position feedback step 54 monitors this change and provides an indication on line 64 to generate a stem event 62.

The generate stem event 62 initiates a process deviation detection step 66 which looks for any process deviation in the process value measurement 40 for a particular set point within a time window, i.e., related to the process response time (i.e., so called "dead time"), as for instance determined in a prior test cycle and with the test cycle process value to set point relationship being stored in the microprocessor 14.

In process comparison step 68, the set point to process value relationship (i.e., set point 38 to process value measurement 40) is looked at with no change in the set point. That is, the process change comparison step 68 is looking for a change between the present set point to process value relationship compared to a prior test cycle set point to process value relationship for this same controller at the same set point. If a difference in the process value to set point relationship is detected, then an event is noted to signal a stem and process alert step 70 to alert an operator indicating a possible valve stem, valve plug, or valve seat problem. The operator can then look for a process problem, which, if detected, would lead to a human inspection of the valve 26.

The foregoing detailed description has been given for clearness of understanding, only, and no unnecessary limitations should be understood therefrom, as modifications will be obvious to those skilled in the art.

What is claimed is:

1. In a microprocessor based valve positioner having a set point input and providing a drive signal for controlling a valve actuator with corresponding drive pressure for operating and positioning a valve stem and plug with respect to a valve seat of a fluid control valve in response to the valve stem position feedback to the valve positioner, a method for providing an indication of a possible failure in the valve stem or plug or seat, said method comprising:

monitoring the drive signal;

monitoring the drive pressure to the valve actuator for detecting a predetermined change from a steady drive pressure with no change in the set point;

monitoring the valve stem position feedback to the valve positioner for detecting a predetermined change from a steady valve stem position feedback with no change in the set point;

providing a stem/plug/seat event indication if at least one of the predetermined changes in steady drive pressure and valve stem position feedback is detected;

responding to the stem/plug/seat event indication and initiating a monitoring of a process value for detecting any deviation in the process value, including monitoring the relationship of the process value for a set point value and detecting any changes in said relationship with no change in the set point; and providing an alarm in response to detecting a change in said relationship thereby indicating a possible valve stem breakage or a damaged valve plug or valve seat.

2. The method of claim 1, wherein said monitoring of a process value includes monitoring the process flow rate.

3. The method of claim 2, wherein said monitoring of the process flow rate includes monitoring the relationship of the process flow rate for a set point value and detecting any changes in said relationship with no change in the set point.

* * * * *